United States Patent [19]

Kakimoto

[11] Patent Number: 4,657,219
[45] Date of Patent: Apr. 14, 1987

[54] FLUID-FILLED ENGINE MOUNT DEVICE
[75] Inventor: Toshihiko Kakimoto, Tokyo, Japan
[73] Assignee: Nissan Motor Co., Ltd., Japan
[21] Appl. No.: 378,738
[22] Filed: Jun. 17, 1982
[30] Foreign Application Priority Data
  May 18, 1981 [JP] Japan .................... 56-74390
[51] Int. Cl.⁴ .............................. F16M 5/00
[52] U.S. Cl. .................. 248/562; 267/140.1;
                                                 248/636
[58] Field of Search ........... 248/562, 565, 636;
                                                 267/140.1

[56] References Cited
U.S. PATENT DOCUMENTS 2,387,066 10/1945 Harding .
4,199,128 4/1980 van den Boom et al. ........ 248/562
4,215,842 8/1980 Brenner et al. ................... 248/562
4,391,435 7/1983 Pham .............................. 267/140.1

FOREIGN PATENT DOCUMENTS 0044545 1/1980 European Pat. Off. .
0006819 1/1981 European Pat. Off. .
2802896 7/1979 Fed. Rep. of Germany .
2435632 4/1980 France .
1581935 12/1980 France .
 811748 4/1959 United Kingdom .
2041485 7/1979 United Kingdom .
2041488 8/1979 United Kingdom .

Primary Examiner—Ramon O. Ramirez
Attorney, Agent, or Firm—Lowe, Price, LeBlanc, Becker & Shur

[57] ABSTRACT

A fluid-filled engine mount device comprises an annular elastic block having inner and outer peripheral sections one of which is connected to a power unit side and the other connected to a vehicle body side; an annular elastic member connected to the elastic block; a partition plate member connected to and elastically supported by the annular elastic member, the partition plate member being formed with an orifice and defining between it and the elastic block a fluid chamber capable of being filled with a fluid; and a diaphragm member disposed in connection with the partition plate member and defining between it and the partition plate member an auxiliary chamber capable of being filled with the fluid, the auxiliary chamber being in communication with the fluid chamber through the orifice thereby effectively damping high frequency fine vibration applied from a power unit.

8 Claims, 3 Drawing Figures

FLUID-FILLED ENGINE MOUNT DEVICE

BACKGROUND OF THE INVENTION

1. Field of the Invention

This invention relates to a fluid-filled engine mount device through which a power unit is mounted on a support body, and more particularly to an engine mount device damping high frequency vibration transmitted from the power unit.

2. Description of the Prior Art

Fluid-filled engine mount devices have been proposed for damping vibration generated in relation to an automotive engine and a vehicle body frame. In these engine mount devices, a rubber block is used to elastically support the engine, while defining a fluid chamber filled with a fluid such as a liquid. The fluid chamber is separate from an auxiliary chamber by a partition plate member, but these chambers communicate through an orifice in the partition plate member. Accordingly, elastic deformation of the rubber block, due to low frequency input vibration, causes a volume change in the fluid chamber, creating fluid movement between the fluid and auxiliary chambers, damping the low frequency vibration. However, high frequency input vibration from the engine is not effectively absorbed by the above-mentioned engine mount device and can be transmitted to the vehicle body frame, causing a booming noise within the vehicle passenger compartment and deteriorating riding comfort.

SUMMARY OF THE INVENTION

According to the present invention, an engine mount device comprises an annular elastic block having inner and outer peripheral sections one of which is connected to a power unit side and the other connected to a support body side. An annular elastic member is connected to the elastic block. A partition plate is connected to and elastically supported by the annular elastic block. The partition plate is formed with an orifice. The partition plate defines with the elastic block a fluid chamber at least a part of which is capable of being filled with a fluid. Additionally, a diaphragm is disposed in connection with the partition plate, defining between it and the partition plate an auxiliary chamber at least a part of which is capable of being filled with the fluid. The auxiliary chamber is in communication with the fluid chamber through the partition plate orifice.

With the above engine mount device of the invention, even high frequency vibration from a power unit can be effectively absorbed, preventing high frequency fine vibration from being transmitted to the vehicle body side. This suppresses fine vibration of the vehicle body and booming noise within a vehicle passenger compartment, improving comfort.

BRIEF DESCRIPTION OF THE DRAWINGS

The features and advantages of the engine mount device according to the present invention will be more clearly appreciated from the following description taken in conjunction with the accompanying drawings in which like reference numerals designate like parts and elements, in which.

DETAILED DESCRIPTION OF THE INVENTION

Figure 1:
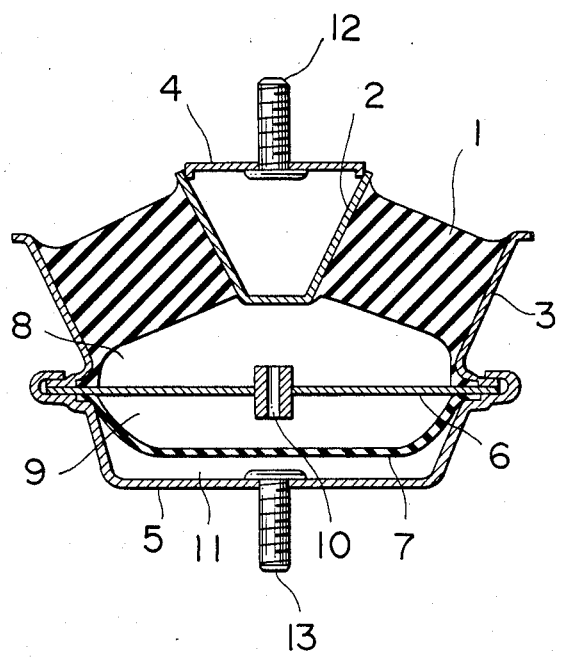
FIG. 1 is a vertical cross-sectional view of a conventional fluid-filled engine mount device.

To facilitate understanding of the present invention, a brief reference will be made to a conventional fluid-filled engine mount device, depicted in FIG. 1. The conventional engine mount device includes a ring-shaped rubber block 1 formed with inner and outer peripheral surfaces to which inner and outer frame members 2, 3 are respectively secured by vulcanization. Fixed to the inner frame member 2 is upper base plate 4 connected to a power unit (not shown). A lower base plate 5 is fixed to the outer frame member 3 by caulking the peripheral section of the lower base plate 5 over the lower end edge of the outer frame member 3. By this caulking, a partition plate member 6 and a diaphragm member 7 are peripherally secured to the outer frame member end edge and the lower plate member peripheral section as shown in the drawing. A fluid chamber 8 is defined between the elastic block 1 and the partition plate member 6. Additionally, an auxiliary chamber 9 is defined between the partition plate member 6 and the diaphragm member 7. The fluid and auxiliary chambers 8, 9 are in communication with each other through an orifice 10 formed in partition plate member 6. The fluid and auxiliary chambers 8, 9 are filled with a fluid. Formed between the diaphragm member 7 and the lower base plate member 5 is an atmospheric chamber 11 which is in communication with atmospheric air through an opening. The reference numeral 12 denotes a bolt for connecting the upper base plate member 4 to the power unit side, and the reference numeral 13 a bolt for connecting the lower base plate member 5 to the vehicle body side such as a body frame.

With the thus arranged conventional fluid-filled engine mount device, when the distance between the upper and lower base plate members 4, 5 varies under the action of input vibration, the rubber block 1 elastically deforms to vary the volume of fluid chamber 8. As a result, fluid flows between the fluid and auxiliary chambers 8, 9 through orifice 10, in which the fluid undergoes flow resistance during its passage through the orifice, thereby damping the input vibration.

Since such vibration damping force in general acts in one direction, particularly only in the upward and downward direction, it has been proposed to decrease the rigidity of the rubber block in its upward and downward direction in order to increase an absorbing effect to high frequency fine vibration. However, it is difficult to significantly decrease the rigidity of rubber block 1 in the horizontal direction; otherwise the power unit can swing. As a result the shape of the rubber block 1 of the conventional engine mount device is selected as shown in FIG. 1 in order to obtain a high shearing effect in the upward and downward direction and a high compression effect in the horizontal direction and the like.

During input of high frequency fine vibration, the rate of volume change in the fluid chamber 8 is higher to increase the flow resistance of the fluid passing through the orifice 10, thereby confining the fluid within the fluid chamber 8. However, the elastic deformation of the rubber block 1 causes the volume change in the fluid chamber 8, accompanying with the pressure variation within the fluid chamber 8. This fluid chamber pressure variation is propagated and transmitted to the partition plate member 6, and finally transmitted through the lower base plate member 5 to the vehicle body side. Therefore, the conventional engine mount device has encountered the disadvantage in which the high frequency fine vibration generated in the power unit side is considerably transmitted to the vehicle body side.

Figure 2:
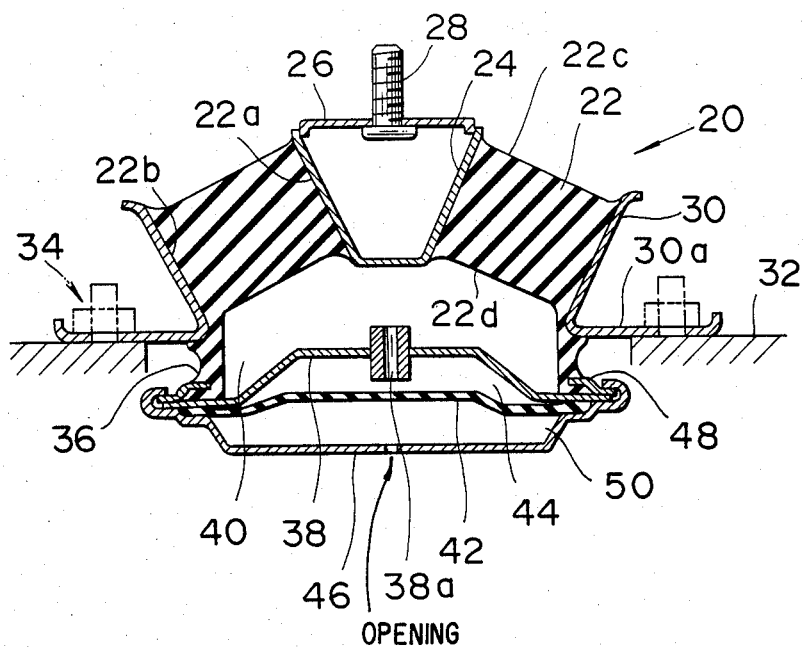
FIG. 2 is a vertical cross-sectional view of a preferred embodiment of a fluid-filled engine mount device in accordance with the present invention.

In view of the above description of the conventional fluid-filled engine mount device, reference is made to FIG. 2, wherein a preferred embodiment of a fluid-filled engine mount device of the present invention is illustrated by the reference numeral 20. The engine mount device 20 comprises an annular or ring-shaped block made of elastic (elastomeric) or resilient material such as rubber. The elastic block 22 is generally umbrella shaped and formed at a central section thereof with a frustoconical opening (no numeral) whose axis is aligned with that of the elastic block 22. The elastic block 22 is formed with an inner peripheral frustoconical surface 22a and an outer peripheral surface 22b of frustoconical shape; accordingly, the inner and outer peripheral surfaces 22a, 22b are generally coaxial and parallel with each other. Additionally, the upper and lower surfaces 22c, 22d of the elastic block 22 are also generally of the frustoconical shape and generally parallel with each other.

An inner frame member 24 is secured to the inner peripheral surface 22a of the elastic block 22 by vulcanization. The inner frame member 24 is generally cup-shaped and so located that its bottom section closes the opening of the elastic block 22. Connected to the inner frame member 24 is an upper base plate member 26 fixed to a power unit side or an automotive internal combustion engine side by means of a bolt 28. A generally annular outer frame member 30 is secured to the outer peripheral surface 22b vulcanization. The outer frame member 30 is formed with an annular flange 30a with the axis of the elastic block 22 perpendicular to the flange section. The flange section 30a is fixed onto a vehicle body side such as a vehicle body frame 32. In this connection, the engine mount device 20 is installed by means of bolts and nuts 34 with the axis of the elastic block 22 perpendicular to the flat surface of the vehicle body frame 32.

As shown, the elastic block 22 is integrally formed at its lower peripheral part with a cylindrical elastic section or member 36 which extends downwardly in the axial direction of the engine mount device 20. The cylindrical elastic section 36 is made of the same material as in the elastic block 22, but is lower in ridigity than the elastic block 22. A partition plate member 38 is securely connected at its peripheral section with the free end portion of the cylindrical elastic section 36, maintaining fluid-tight seal therebetween. The partition plate member 38 is formed at its central portion with an orifice 38a. A fluid chamber 40 is defined between the partition plate member 38 and the lower surface 22d of the elastic block 22 in combination with the bottom section of the inner frame member 24. A diaphragm member 42 is securely connected at its peripheral section with the partition plate member 38, maintaining therebetween a fluid-tight seal. An auxiliary chamber 44 is defined between the diaphragm member 42 and the partition plate member 38. The auxiliary chamber 44 is in communication with the fluid chamber 40 through the partition plate member orifice 38a. The fluid and auxiliary chambers 40, 44 are filled with a fluid, usually with a liquid. Securing the partition plate member 38 and the diaphragm member 42 in position is achieved by caulking the peripheral section of a bottom plate member 46 over an annular plate member 48 which is secured to the cylindrical elastic section 36 of the elastic block 22 by vulcanization. The bottom plate member 46 defines between it and the diaphragm member 42 an atmospheric chamber 50 in communication with atmospheric air through an opening formed in the bottom plate member 46.

The manner of operation of the engine mount device 20 will be discussed hereinafter.

The elastic block 22 is designed to support the power unit in the upward and downward direction or the axial direction of the elastic block 22 mainly by its shearing stress and in the horizontal direction or the direction perpendicular to the axis of the elastic block 22 mainly by its compressive stress. Under this action, the rubber block 22 elastically deforms in the upward and downward direction when input vibration is applied thereto. In case where this input vibration is of low frequency as during bound and rebound of the vehicle body, the volume change of the fluid chamber 40 occurs, so that fluid movement takes place between the fluid chamber 40 and the auxiliary chamber 44 through the partition plate member orifice 38a, thereby generating flow resistance of the fluid passing through the orifice 38a. This flow resistance damps the input vibration applied to the engine mount device 20.

In case where the input vibration is from the power unit and of high frequency, the amount of deformation of the elastic block 22 is smaller due to the fact that the amplitude of the input vibration is smaller. This causes a smaller pressure variation in the fluid chamber 40. However, the rate of pressure variation within the fluid chamber 40 is higher due to the high frequency vibration, which causes the flow resistance of the fluid through the orifice 38a to become higher, thus combining the fluid within the fluid chamber 40. Under this condition, the volume of the fluid chamber 40 changes due to the elastic deformation of the elastic block 22, which seems to make the pressure variation within the fluid chamber 40. However, in response to this pressure variation within the fluid chamber 40, the cylindrical elastic section 36 of the elastic block 22 expands and contracts in the upward and downward direction, thereby, in fact, suppressing the pressure variation within the fluid chamber 40. Thus, the high frequency fine vibration applied to the engine mount device 20 is certainly absorbed by the elastic deformation of the cylindrical elastic section 36. Furthermore, since the pressure variation is not made in the fluid chamber 40, there is no transmission of the high frequency fine vibration due to the pressure variation within the fluid chamber 40. As a result, the high frequency fine vibration from the power unit is effectively prevented form being transmitted to the vehicle body side.

Figure 3:
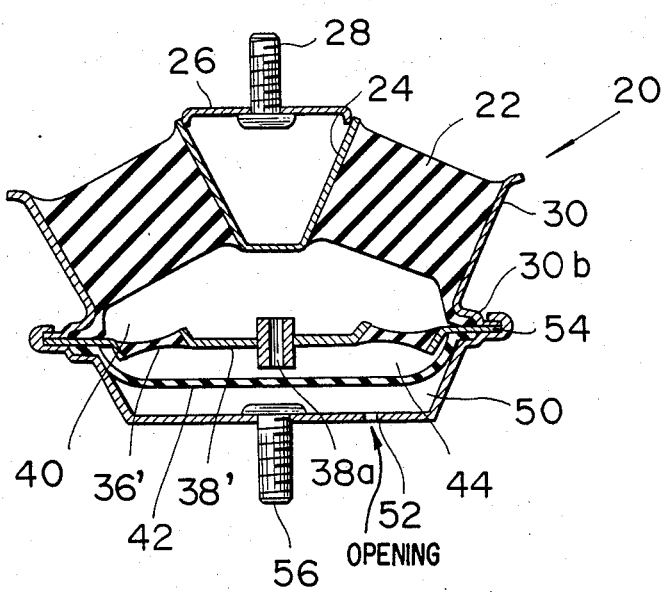
FIG. 3 is a vertical cross-sectional view similar to FIG. 2, but showing another embodiment of the engine mount device in accordance with the present invention.

FIG. 3 illustrates another embodiment of the engine mount device according to the present invention. In this embodiment, a lower base plate member 52 is securely connected at its peripheral section with a peripheral flange section 30b of the outer frame member 30 by caulking or crimping the lower base plate member peripheral section over the outer frame member peripheral flange section. By this caulking, an annular plate member 54 is secured between the outer frame member flange section 30b and the lower base plate member 52, and the diaphragm member 42 is securely connected to the annular plate member 54. In this case, the partition plate member 38' is connected to the annular plate member 54 through an annular elastic member 36' so that the partition plate member 54 is movably supported while defining the fluid chamber 40 between the elastic block 22 (with the inner frame member 24) and the partition plate member 38' in combination with the annular elastic member 36' and the annular member 54. In this connection, the auxiliary chamber 44 is defined between the diaphragm member 42 and the partition plate member 38' in combination with the members 36', 54. It will be understood that the atmospheric chamber 50 is formed between the diaphragm member 42 and the inner surface of the lower base plate member 52. The lower base plate member 52 is connected to the vehicle body side by means of a bolt 56 secured thereto. With this arrangement, the movement of the partition plate member 38' due to the pressure variation within the pressure chamber 40 is made under the elastic deformation of the annular elastic member 36' in the shearing direction thereof. It will be understood that the configuration and operation of the other parts of the engine mount device of this embodiment are similar to those of the device shown in FIG. 2.

As is appreciated from the above, according to the present invention, the partition plate member of the engine mount device is elastically supported by an annular elastic member. Therefore, even if fine pressure variation is generated within the fluid chamber of the engine mount device during the input of high frequency fine vibration, the pressure variation can be absorbed by virtue of the elastic deformation of the annular elastic member, thereby preventing the transmission of the vibration to the vehicle body side. This effectively suppresses the fine vibration of the vehicle body and booming noise within a passenger compartment, thus improving the vehicle comfortableness to ride in. Furthermore, according to the present invention, since the pressure variation within the pressure chamber can be absorbed, the elastic block is not expected to absorb the pressure variation, which reduces the requirements to the elastic block in its designing. This increases the freedom in selecting the ratio between the rigidies in the vertical direction and in the direction perpendicular to the vertical direction.

What is claimed is:

1. An engine mount device comprising:
    an annular elastic block having inner and outer peripheral sections one of which is connected to a power unit side and the other connected to a support body side;
    a partition plate;
    an annular elastic member connected directly to and extending between said elastic block and said partition plate;
    said partition plate member connected to and elastically supported by said annular elastic member, said partition plate member being formed with an orifice and defining between it and said elastic block a fluid chamber at least a part of which is capable of being filled with a fluid; and
    a diaphragm member connected with said partition plate member and defining between it and said partition plate member an auxiliary chamber at least a part of which is capable of being filled with said fluid, said auxiliary chamber being in communication with said fluid chamber through said partition plate member orifice,
    wherein peripheral edges of said partition plate are elastically supported by said annular elastic member and thereby movable relative to the elastic block in upward and downward directions in response to deformation of said annular elastic member.

2. An engine mount device as claimed in claim 1, further comprising first and second frame members connected to said inner and outer peripheral sections, respectively, said first and second frame members being connected to the power unit side and the support body side, respectively.

3. An engine mount device as claimed in claim 1, wherein the power unit side includes an automotive internal combustion engine, and the support body side includes an automotive vehicle body frame.

4. An engine mount device as claimed in claim 1, wherein said annular elastic member is a generally cylindrical elastic section.

5. An engine mount device as claimed in claim 1, wherein said cylindrical elastic section is integral with the lower part of said elastic block and of like material as said elastic block, said cylindrical elastic member being lower in rigidity than said elastic block.

6. An engine mount device as claimed in claim 5, further comprising a bottom plate member directly connected to said diaphragm member, said bottom plate member defining between it and said diaphragm member an atmospheric chamber which is in communication with atmospheric air.

7. An engine mount device as claimed in claim 6, wherein said bottom plate member is caulked over an annular rigid member which is secured to said cylindrical elastic section, in which said partition plate member and said diaphragm member are securely interposed between said cylindrical elastic member and said bottom plate member.

8. An engine mount device comprising:
    an annular elastic block having inner and outer peripheral sections one of which is connected to a power unit side and the other connected to a support body side;
    an annular elastic member connected directly to said elastic block;
    a partition plate member connected directly to and elastically supported by said annular elastic member, said partition plate member being formed with an orifice and defining between it and said elastic block a fluid chamber at least a part of which is capable of being filled with a fluid; and
    a diaphragm member connected with said partition plate member and defining between it and said partition plate member an auxiliary chamber at least a part of which is capable of being filled with said fluid, said auxiliary chamber being in communication with said fluid chamber through said partition plate member orifice, wherein said annular elastic member is a generally cylindrical elastic section directly connected to said elastic block so as to connect said partition plate member with said elastic block, said cylindrical elastic section defining therewithin said fluid chamber, and wherein said cylindrical elastic section is integral with the lower part of said elastic block and of like material as said elastic block, said cylindrical elastic member being lower in rigidity than said elastic block.

* * * * *